Patented Sept. 19, 1933

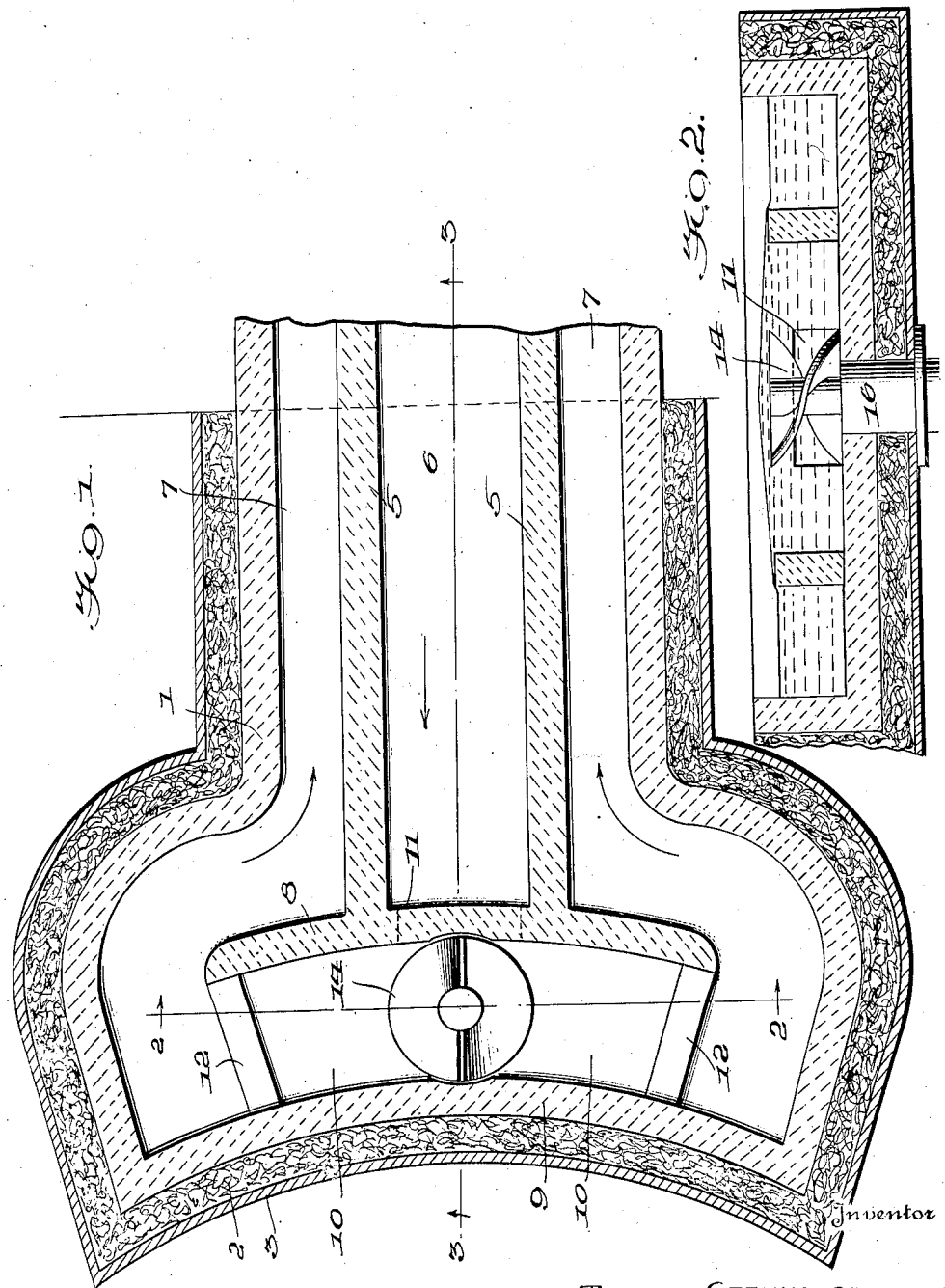

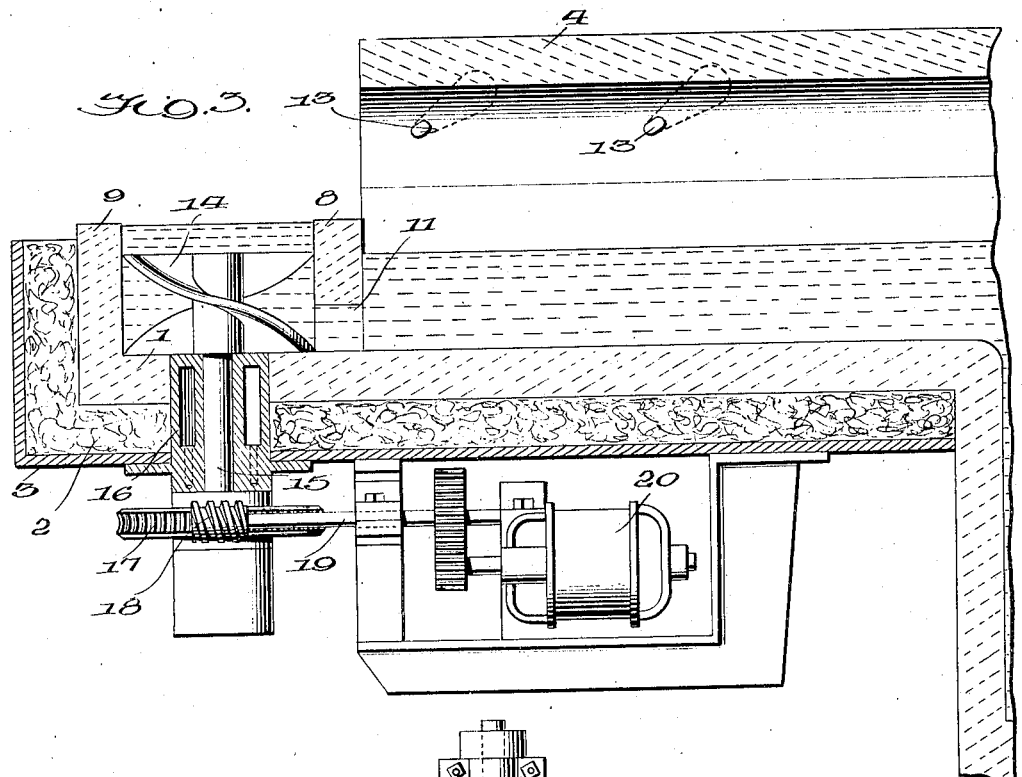
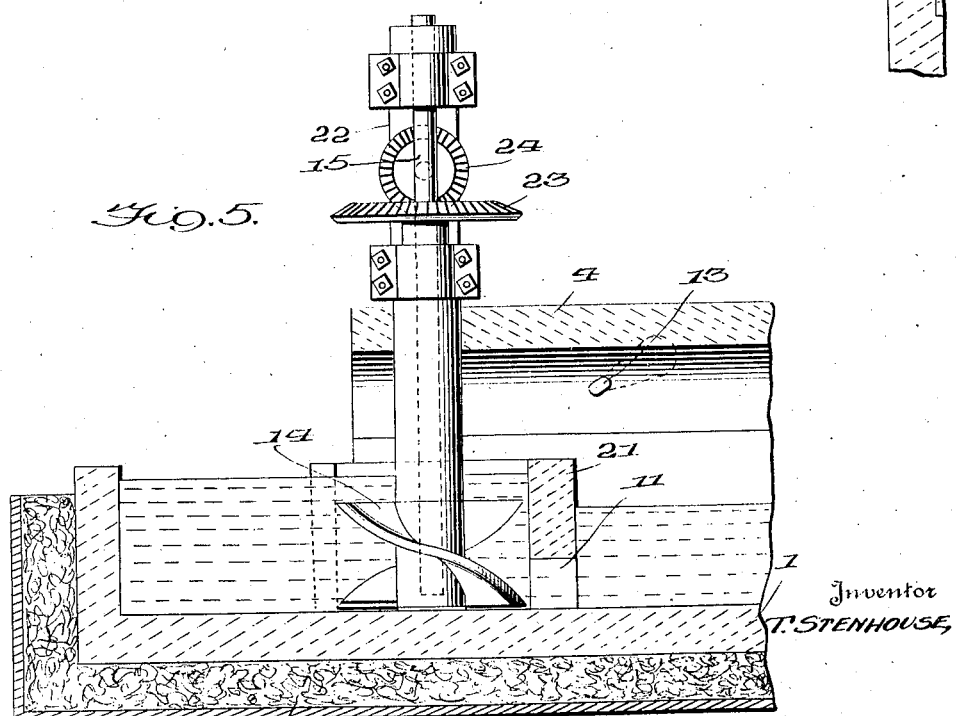

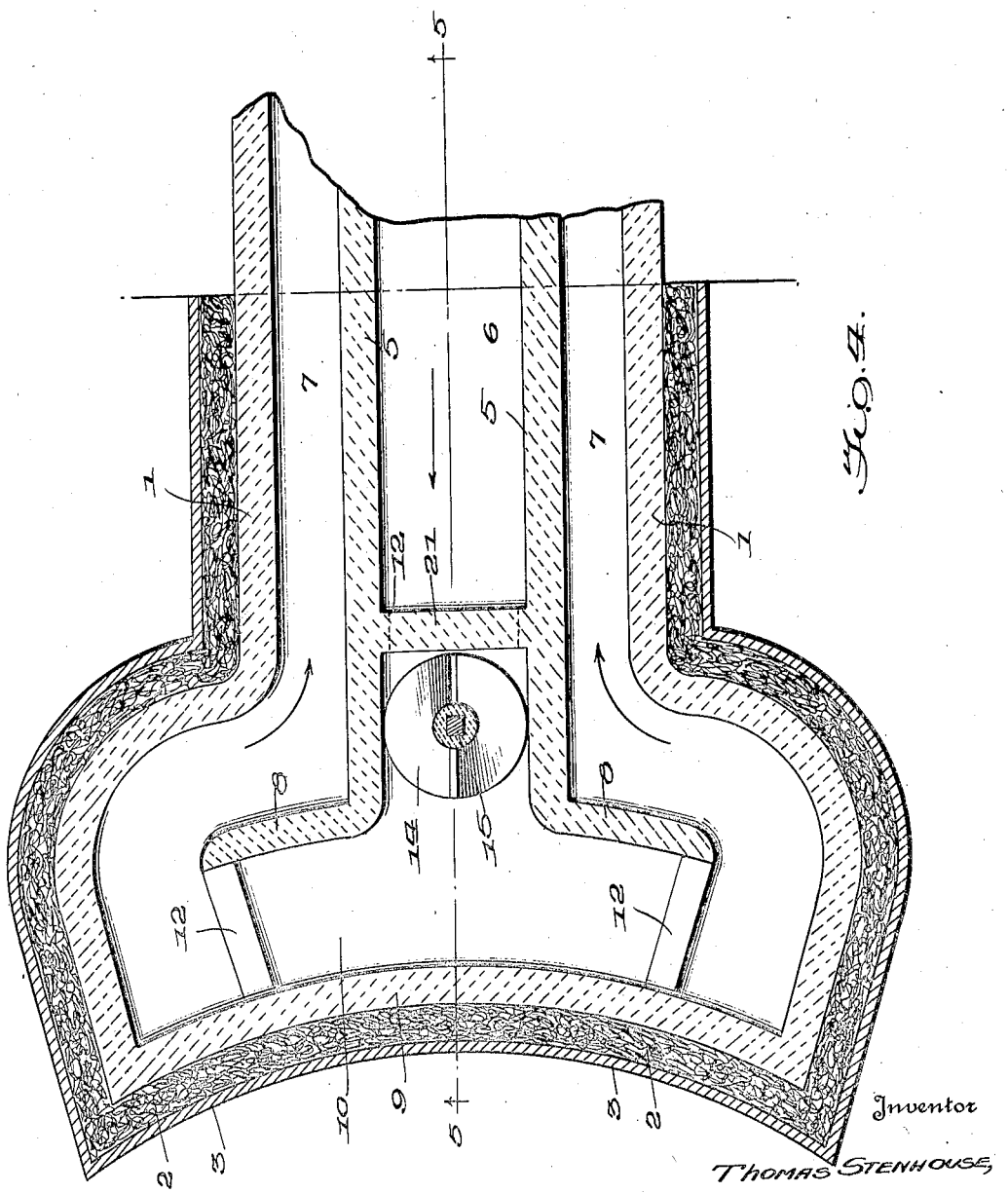

1,927,101

UNITED STATES PATENT OFFICE 1,927,101

METHOD AND APPARATUS FOR FLOWING GLASS

Thomas Stenhouse, Washington, Pa., assignor to Hazel-Atlas Glass Co., Wheeling, W. Va., a corporation of West Virginia Application August 30, 1927. Serial No. 216,438

14 Claims. (Cl. 49—56)

The object of the invention is to supply a continuous stream of fresh glass to the well known Owens machine, without the use of the revolving pot now universally employed. I mention the Owens machine merely as an example, for the invention is applicable to any forming machine of the suction type, whether continuously rotated, intermittently rotated, or consisting of individual stationary units. Therefore, whenever mention is made herein to the Owens machine, it will be understood to include any machine in which the molds are charged by suction.

In the operation of the Owens machine it is necessary, for reasons well known, that fresh glass be presented to the successively arriving suction blank molds. For this purpose a large slowly revolving pot is used as an auxiliary to the melting tank, and the glass flows into this revolving pot by gravity from the refining end of the melting tank. These revolving pots are necessarily very large, and the glass therein must be kept at working temperature. The rear portion of the pot is covered with an arch, but a very considerable portion of the pot must be entirely exposed, to provide for the successive passage of the molds across the face of the glass in the pot. It is needless to say that this results in a tremendous loss of heat; and one of the main objections to the present use of Owens machine, or other suction machines is the heavy fuel consumption of these revolving pots. Therefore, the main object of the present invention is to elminate these revolving pots, and provide other means for presenting virgin glass to suction molds, which will avoid the waste of heat inherent in the now universally used revolving pot.

I am aware that several different means have been previously suggested to take the place of the revolving pot, but such means have never met with any success. For example, it has been suggested that oscillating paddles or rotating paddle wheels be employed for causing movement of the glass. There are numerous reasons why such devices fail to accomplish the results of the present invention sought; but it is sufficient to state here that such devices must be removed and reintroduced into the glass for each stroke, or for each rotation, thereby chilling the glass which adheres to the implement; and further, that in the use of such devices the glass is subjected to intermittent impulses which constantly produce variations in the level of the glass. I think it may be assumed at the outset, that any device which is to take the place of the revolving pot by providing other means for presenting fresh glass to the suction molds, must not employ any implement which is alternately exposed to the glass and the atmosphere; and must operate without producing any variations or waves in the glass.

Having briefly outlined the objects of the invention, and the essentials of a successful substitute for the revolving pot, I shall now describe the particular apparatus disclosed herein as exemplifying the invention, by means of which I am able to constantly maintain a head of glass above the level of the glass in the tank, whereby the glass will flow back to the tank by gravity. In the following description reference is to be had to the accompanying drawings; in which Figure 1 is a horizontal sectional view through the flow spout, and showing in plan the upper end of the constantly rotating propeller; the rear end of the spout being broken away.

Figure 2 is a transverse vertical sectional view taken on line 2—2 of Figure 1.

Figure 3 is a longitudinal vertical sectional view taken on line 3—3 of Figure 1.

Figure 4 is a view similar to Figure 1, but showing the propeller differently positioned in the spout; and Figure 5 is a longitudinal vertical sectional view taken on line 5—5 of Figure 4.

Referring to the drawings more in detail, numeral 1 refers generally to a spout or the like, which is, of course, made of refractory material. The spout is preferably provided with a layer of heat insulating material 2, and with a metallic casing 3. In some instances it may be desirable to eliminate the insulation and substitute heating means. A plurality of these spouts are mounted on a continuous melting tank, and the rear ends of the spouts are associated with the tank in any desired manner; it being understood that the floors of the spouts are below the level of the glass in the tank, so that the glass will flow into the spouts. Numeral 4 indicates the cover which extends entirely over the spout, with the exception of the area which is necessarily exposed for the passage of the suction molds, as will be described hereinafter.

By reference to Figure 1, it will be seen that the particular form of flow spout illustrated herein comprises two partitions 5, which project upwardly above the level of the glass, and which divide the flow spout into three channels, a central channel 6, and two outboard channels 7. As will appear hereinafter, the central channel is for the fresh glass flowing out of the tank to the point where the molds are to be charged, and the two outboard channels are for returning the glass to the tank. The tank may or may not have the conventional bridgewall; and the glass flowing into the channel 6 may be taken from a point near the surface of the tank, or it may be taken from a point near the bottom thereof, as illustrated by the patent to Robert Good, No. 1,579,353, April 6, 1926.

A transverse partition 8 is arranged at the ends of the partitions 5. This transverse partition projects above the level of the glass in the tank, and it is spaced from the front wall 9 of the flow spout, thereby forming the mold-supplying channel 10 over which the molds successively pass, the walls 8 and 9 being formed on the arcs of circles, the center of which circles is the center of the forming machine. The wall 8, between the partitions 5, is provided with a submerged passage 11, which permits the glass to flow from channel 6 into channel 10. Partitions 12 extend across the the ends of the channel 10, and as illustrated in Figure 2, the tops of these partitions are slightly below the head of glass which I produce in channel 10 in a manner to be described, but are slightly above the normal level of the glass in the channels 7; so that the partitions 12 function as dams over which the glass flows from the channel 10 to the channels 7. The flow spout may be provided with burner ports 13, positioned as desired, in accordance with the established practice.

In the construction thus far described, it is apparent that there would be no movement of the glass, for the glass in the central channel 6, side channels 7, and the curved end channel 10, would all be at the same level, which level would be the same as that of the glass in the tank. To cause a constant flow of glass to get rid of the tailings and other glass which has been contaminated by the molds or shears, I constantly provide a head of glass in the channel 10, above the level of the glass in the tank, so that the glass will flow by gravity from the channel 10 to the side channels 7, and then return to the tank, I shall now describe the specific construction of the device for maintaining this head of glass in channel 10 above the level of the glass in the tank.

Numeral 14 indicates a screw or propeller which is mounted in the channel 10 adjacent the submerged passage 11. This propeller is made of mullite or other refractory material suitable for the purpose, and is constantly rotated by any desired means. In the particular construction illustrated, the propeller is carried by a shaft 15 mounted in a water-cooled bushing 16, and having a worm gear 17 on its lower end; the bushing being provided with the usual inlet and outlet pipes, to maintain a constant flow of water therethrough. Meshing with the worm gear 17 is a worm 18 on a shaft 19 driven by a motor 20, or by any other convenient and suitable power.

It is apparent that with very slight modifications I may employ an overhead drive; such an arrangement being illustrated in Figures 4 and 5. If an overhead drive is employed, the propeller cannot be placed in the channel 10, for the driving connection would interfere with the passage of the molds. Therefore, I move the propeller back into the channel 6, but divide the region where the propeller is located from the remainder of the channel 6 by a partition 21; this partition having the hereinbefore described submerged passage 11. Otherwise, the construction of the spout remains the same as that illustrated in Figure 1. The propeller is carried by the shaft 15, which in this case extends upwardly through the top of the spout and is mounted in suitable bearings carried by the bracket 22. Keyed to this shaft is a bevel gear 23 meshing with a bevel gear 24 driven by any convenient power, such as a motor (not shown). Of course, any desired means may be employed for driving the propeller, either from below or overhead; and, of course, the operation, which will now be described, is the same in both of the forms illustrated herein.

In operation, the propeller is constantly rotated, thereby lifting the glass above the level of the glass in the tank, and thus drawing glass from the channel 6 through the submerged passage 11. The head of glass thus formed, being above the tank glass level, and consequently above the level of the glass in the channels 7, will flow by gravity toward each end of the mold supply channel 10, passing over the walls 12 and into the side channels 7, where it will return to the tank. Thus by providing this head of glass I set up a constant flow of glass from the tank through channel 6 and the submerged passage 11, then through the mold supply channel 10 toward opposite ends thereof, and then through the side channels 7 back to the tank. Therefore, a constant stream of fresh glass is being introduced into the mold supply channel 10, and it will be noted that this glass is introduced at the surface of the glass in this channel; it being vital to the successful operation of forming machines of the suction mold type, that there be a fresh surface presented to each succeeding mold. In the operation of forming machines of this character, the surface of the glass is chilled by contact with the blank molds, and the tailings which are severed from the glass in the molds are chilled during the severing operation, also these tailings often collect air bubbles as they flop over onto the surface of the glass. In accordance with the present invention this contaminated glass is gradually moved toward the side channels, so that fresh glass is presented to each succeeding mold; and the contaminated glass finally flows through these side channels back into the tank, so that it will be thoroughly incorporated with the glass in the tank. If desired, any suitable baffles may be employed in the tank to prevent the possibility of a current being set up in the tank between the central channel 6 and side channels 7; or, as suggested hereinbefore, this possibility may be avoided by taking the glass for the central channel from the bottom of the tank, in the manner disclosed in the patent to Good #1,579,353.

I have described specifically a structure employing a central channel and a side channel, but it is apparent that the invention is not limited to any such structure; all that is necessary is a channel for the outflowing glass and a channel for the returning glass, together with means for maintaining a constant head of glass above the level of the glass in the tank. And in its broad aspect this invention contemplates any means or method of providing a constantly moving mass of glass by maintaining a constant head of glass above the level of the glass in the flow spout. And accordingly, it will be understood that the specific structures disclosed herein are merely illustrative of the invention, all modifications of which I aim to include in the following claims.

What I claim is:

1. The method of flowing glass for suction mold forming machines, which consists in establishing, in a closed circuit including a tank, a constant head of glass above the level of the glass in the tank.

2. The method of flowing glass for suction mold forming machines, which consists in establishing a constant head of glass above the level of the glass in the tank, and flowing the glass therefrom back to the tank.

3. The method of flowing glass for suction mold forming machines, which consists in establishing, in a closed circuit including a tank, a constant head of glass above the level of the glass in the tank, and causing the glass to flow therefrom in different directions.

4. The method of flowing glass in a channel communicating at both ends with a tank, for suction molds, which consists in maintaining a constant head of glass above the normal glass level and causing the glass in the channel to flow in opposite directions from said head.

5. An apparatus of the character described, including a mold supply channel communicating at both ends with a glass tank, and means for maintaining a constant head of glass in said channel at a higher level than the glass in the tank.

6. An apparatus of the character described, including a glass channel communicating at both ends with a glass tank, and a screw propeller for maintaining glass in said channel at a higher level than the glass in the tank.

7. An apparatus of the character described, including a glass channel communicating at both ends with a glass tank, and a vertically acting propeller for maintaining a constant head of glass above the normal level of the glass in said channel.

8. An apparatus of the character described, including a glass channel communicating at both ends with a glass tank, a vertically acting propeller for maintaining a constant head of glass above the normal level of the glass in said channel, and means operating from above to constantly rotate said propeller.

9. An apparatus of the character described, including a glass channel both ends of which communicate with a glass tank, means for causing a constant flow of glass through said channel by establishing a constant head of a glass above the tank glass level, and means for obstructing the flow of glass from said head in one direction.

10. An apparatus of the character described, including a glass channel both ends of which communicate with a glass tank, means within said channel for causing a constant flow of glass therethrough by establishing a constant head of glass above the tank glass level, and means for obstructing the flow of glass from said head in one direction.

11. An apparatus of the character described, including a mold supply channel, two channels communicating with the first-mentioned channel and with the tank, and means within one of said channels for forming a constant head of glass above the level of the tank glass level.

12. An apparatus of the character described, including a mold supply channel communicating at both ends with a tank, and means for maintaining a constant head of glass above the normal glass level and causing glass to flow in opposite directions in said channel.

13. An apparatus of the character described, including a mold supply channel communicating at both ends with a tank, and means for maintaining a constant head of glass above the normal glass level and causing glass to flow by gravity in opposite directions in said channel.

14. An apparatus of the character described including a mold supply channel, a central supply channel and two side channels communicating with the mold supply channel and with a glass tank, a vertically acting propeller in one of said channels, means for constantly rotating said propeller to provide a constant head of glass above the level of the glass in the tank, and means for obstructing the flow of glass from said head to the supply channel.

THOMAS STENHOUSE.